INVENTOR:
Johannes Bernardus Van Der Winden
By: Haseltine, Lake & Co. AGENTS.

Oct. 4, 1955 J. B. VAN DER WINDEN 2,719,478
STERILIZATION OF FOODSTUFFS PACKED IN CONTAINERS
Filed May 28, 1952 5 Sheets-Sheet 4

Oct. 4, 1955   J. B. VAN DER WINDEN   2,719,478
STERILIZATION OF FOODSTUFFS PACKED IN CONTAINERS
Filed May 28, 1952   5 Sheets-Sheet 5

INVENTOR:-
Johannes Bernardus Van
Der Winden
By: Haseltine, Lake & Co
AGENTS.

United States Patent Office 2,719,478
Patented Oct. 4, 1955

2,719,478

STERILIZATION OF FOODSTUFFS PACKED IN CONTAINERS

Johannes Bernardus van der Winden, Amstelveen, Netherlands, assignor to Gebr. Stork & Co.'s Apparatenfabriek N. V., Amsterdam, Netherlands, a corporation of the Netherlands Application May 28, 1952, Serial No. 290,408

Claims priority, application Netherlands May 29, 1951

2 Claims. (Cl. 99—360)

This invention relates to apparatus for the continuous sterilization of foodstuffs packed in containers of the type comprising an over-pressure steam chamber which is in open communication with the short leg of at least one open U-shaped liquid seal. Through this system moves an endless conveyor, extending outside the system and provided with carriers for the containers, the carriers being suspended in the conveyor so as to be rotatable about horizontal axes. Apparatus of this type is known per se. It can easily be designed for a very large capacity, and operates in a very reliable manner. It has the important advantage that the containers will become subjected to increased external pressure (inside the liquid seal) to the same extent to which their internal pressure increases owing to the heating, a circumstance which prevents the deformation of the containers. The heat economy of this apparatus is high.

In the known apparatus loading and unloading is effected carrier after carrier. Each carrier has to be filled and emptied separately, and in practice this has to be done entirely by hand, because each container has a different position on the carrier, and consequently requires different handling. The invention aims in particular at designing the carriers in such a manner that automatic loading and unloading will become possible, or at least that it will be possible to effect loading and unloading in a more rational, i. e., a quicker, way.

While travelling through the known apparatus, the containers to be sterilized are at rest relatively to one another, i. e., their position does not change, since the position of the carriers themselves does not change either, because they are freely rotatable and are suspended on their axes with a low centre of gravity. For some foodstuffs to be sterilized this involves some drawbacks, for example for fat-containing substances, since fat always tends to float on top, so that the homogeneity of the contents of the containers is affected. The preservation of the homogeneity of the contents of the containers would be promoted if the containers were kept moving during sterilization, but for this a slow or intermittent slight movement suffices. In this respect also the invention aims at providing an improvement.

According to the invention, in apparatus of the type described, the carriers are therefore rotatable within the system about their supporting shaft, in connection with which the carriers, considered in their cross-section at right angles to the shaft, enclose the containers completely, means being provided for rotating the carriers within the system.

It should be noted that it is already known per se to send containers through a sterilization chamber and to impart to them a motion causing them to change their position. In that case the containers are sent separately from one another through the sterilization chamber lying on their curved surfaces (the containers concerned are shaped as bodies of revolution such as cans). It is said to be an advantage of the horizontal travel of the cylindrical containers through the system that a continuous rotary motion is imparted to the latter by causing them to roll, during their travel, along the walls of the tubes constituting the chambers in which they are treated, said rotary motion being supposed to promote the heat exchange between the containers and their surroundings.

However, such a rolling mode of travelling of the containers through the system involves much risk of jamming, which may cause a standstill, damage to the containers or the apparatus, and expensive disassembly and repairs. Another great drawback is that the apparatus can be designed for practically only one size of cylindrical containers, which amounts to an inadmissible restriction in the food-canning industry. Finally an apparatus of this type is not very suitable for varying loads. The stream of containers has to be absolutely continuous, i. e., full load only is possible.

In the present invention a carrier may contain a number of tubular channels extending in the direction of the supporting shaft, that is, extending parallel to the axis of rotation of the carrier, these channels being disposed annularly about the shaft and designed as spaces for the containers, in such a way that the carrier, at least when filled with containers, is in almost neutral equilibrium about the supporting shaft. A carrier of such a design is simple and reliable in construction, easily rotatable, and easily loaded and unloaded.

The rotation can take place according to the invention without the loading and unloading being impeded by it, because the containers are provided, concentrically with the supporting shaft, with an annular row of teeth, with which engages an endless chain travelling in parallel with the path of the conveyor, but departing from said path at the loading and unloading stations for the containers, so that the carriers may be freely rotatable at these stations.

One embodiment of the invention will be described with reference to the accompanying drawings, in which.

Figure 1:
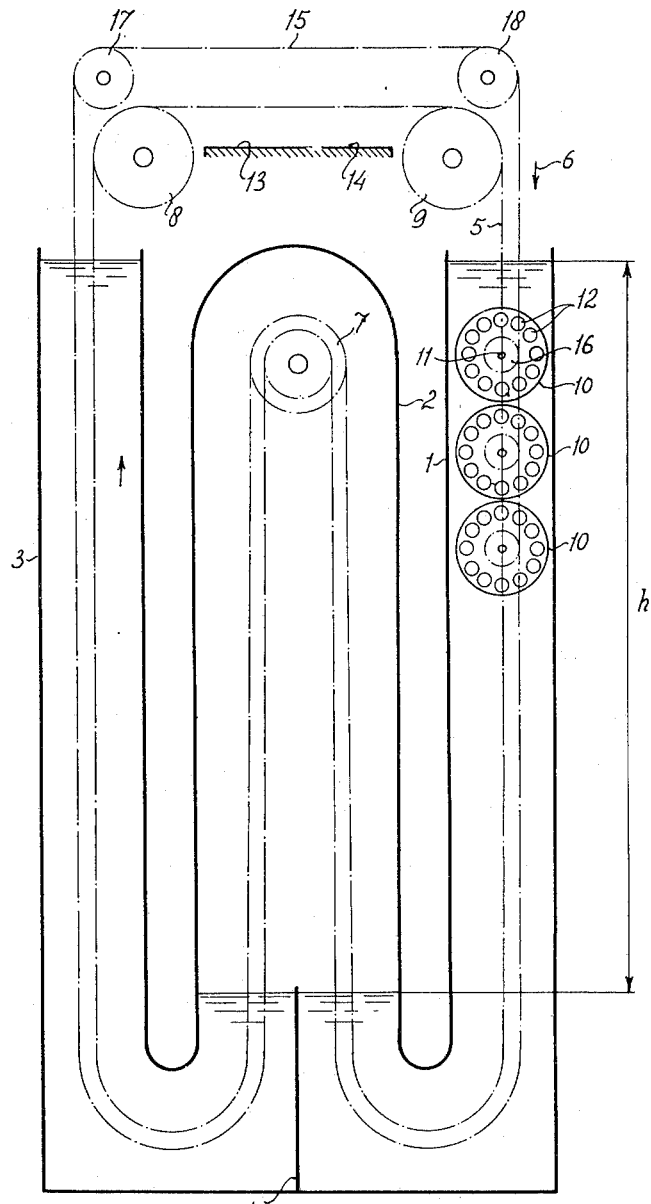
Figure 1 is a diagrammatic representation of the apparatus.

The apparatus shown in Figure 1 mainly consists of three towers 1, 2, 3. These towers communicate at the bottom, so that they enclose a volume resembling two U-tubes placed side by side. For this purpose the bottom space of the central tower 2 is divided in two by a partition 4.

The tower 2 is the sterilization chamber proper, into which steam is admitted. Water is present both in the tower 1 and in the tower 3. The difference $h$ between the water level in the towers 1 and 3, respectively, and the water level in the central tower 2 is caused by the steam pressure in the central tower 2. This difference in level $h$ also inversely determines the steam pressure.

An endless conveyor 5 travels in the direction of the arrow 6 in the top of the tower 1 inwards, passes through the whole tower 1 from top to bottom, reverses its direction by 180°—hanging freely in a loop or guided along pulleys—and then ascends in the tower 2 into the steam chamber. At the top of the tower 2 the conveyor passes along a pulley 7, after which the direction of the conveyor is again reversed by 180°. The conveyor then descends in the tower 2, reaches the water again at the bottom, and again reverses its direction by 180°, either by being guided along pulleys or because the conveyor hangs freely in a loop. The conveyor subsequently ascends through the water in the tower 3, passes along the pulley 8, and returns via the pulley 9 to the path described above.

The conveyor 5 consists of at least two parallel chains, covered across its entire length with carriers or supports 10, only three of which are shown in Figure 1. These carriers or supports 10 are cylindrical, and in their center lines are freely rotatable on shafts 11, which have been provided between the conveyor chains. The supports 10 consist of circular bundles of axially extending tubes 12, into which the containers to be sterilized are pushed.

When the conveyor circulates, the containers are preheated in the water of the tower 1, sterilized in the steam of the tower 2, and cooled in the water of the tower 3. The passage is continuous, and it is exactly in this respect that the system can be considered to be perfectly "open."

After having passed along the pulley 8, the supports 10 can be unloaded, i. e., the containers now sterilized can be taken out. The unloading station has been diagrammatically designated by 13. Beside it is the loading station 14, likewise indicated diagrammatically.

Parallel to the conveyor chains 5, a chain 15 passes through the apparatus. Gear wheels 16 on each support 10 are in mesh therewith. The speed of this chain 15 is slightly different from that of the conveyor chains 5, with the result that the supports 10 are constantly, though slowly, rotated. In consequence of this, the position of the containers containing the foodstuffs to be sterilized is constantly varied, so that the food does not clot, while the formation of skins (for example on milk) is also actively prevented.

In the upper horizontal part between the pulleys 17 and 18 the driving chain 15 is so far removed from the conveyor chains 5 that the chain 15 no longer engages in the sprockets 16. The result is that at the loading and unloading stations 14, 13, the supports 10 are freely rotatable, and can thus be freely manipulated for the loading and unloading operations.

Figure 2:
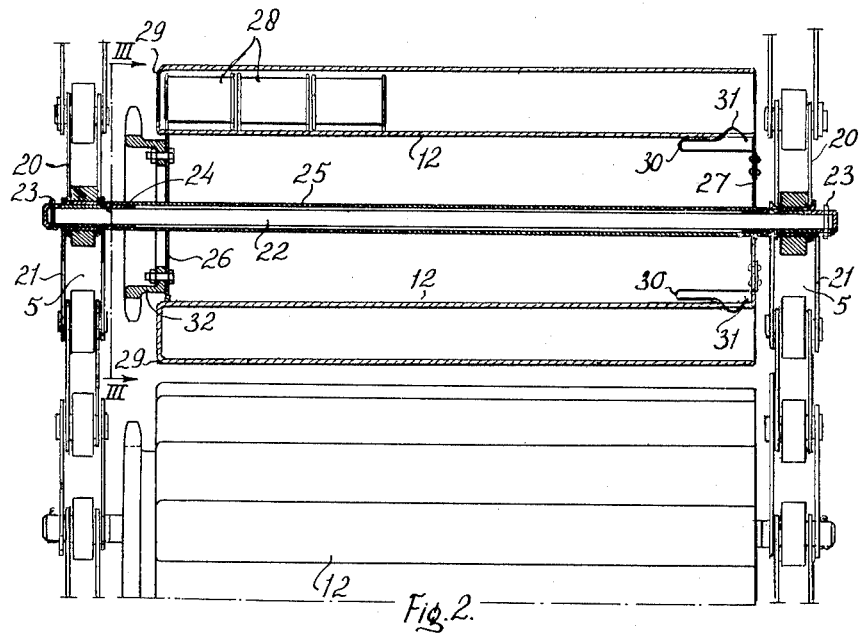
Figure 2 is a diagrammatic side elevation, on an enlarged scale, of part of the conveyor chain with containers.
Figure 3:
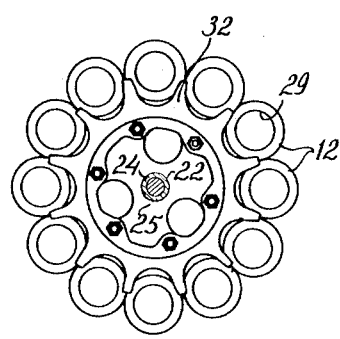
Figure 3 is a cross-section on the line III—III, Figure 2.

Figures 2 and 3 show part of the conveyor system.

The two conveyor chains 5 consist alternately of narrow links 20 and broad links 21. The two chains are interconnected by shafts 22, locked in the chains by means of split pins 23. On the shafts 22 are mounted bearing bushings 24, made, for example, of synthetic resin. On these bearing bushings 24 rotates the support proper, consisting of a hollow core 25 enclosing the shaft 22 with two terminal flanges 26, 27. Between these flanges are fitted the axially extending tubes 12 (see Figure 1), disposed in a circle. Into these tubes the containers for the foodstuffs to be sterilized can be pushed. By way of example, Figure 2 shows the tins 28 with foodstuffs. At one end, at 29, the tubes 12 are flanged inwardly, so as to prevent the tins 28 being pushed out at this end. At the other end they have a spring latch 30, which lies outside the tubes, but with a bead-shaped part 31 reaching inwards through a slot. These springs 30 prevent the tins 28 leaving the tubes 12 during their passage through the system, but when some force is exerted, these tins can easily be pushed in two directions across the bead 31.

Figure 4:
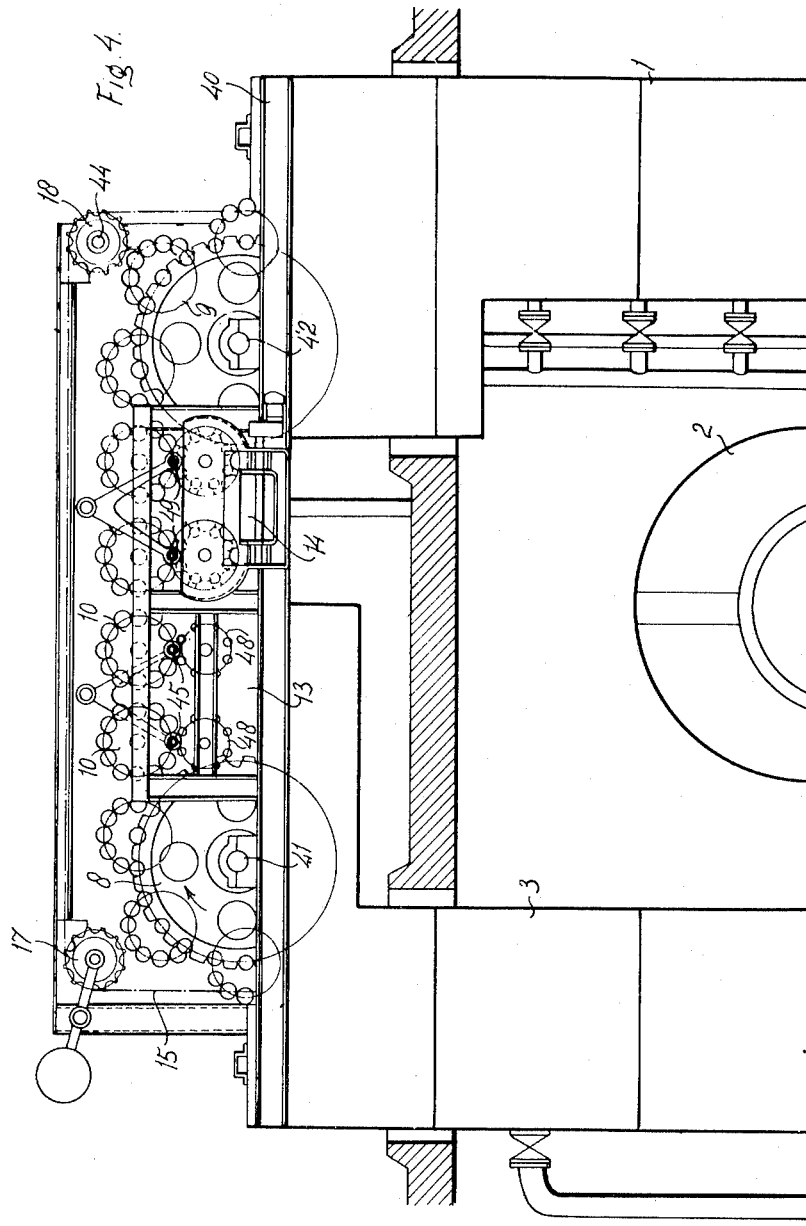
Figure 4 shows the upper part of the apparatus with driving mechanism.
Figure 5:
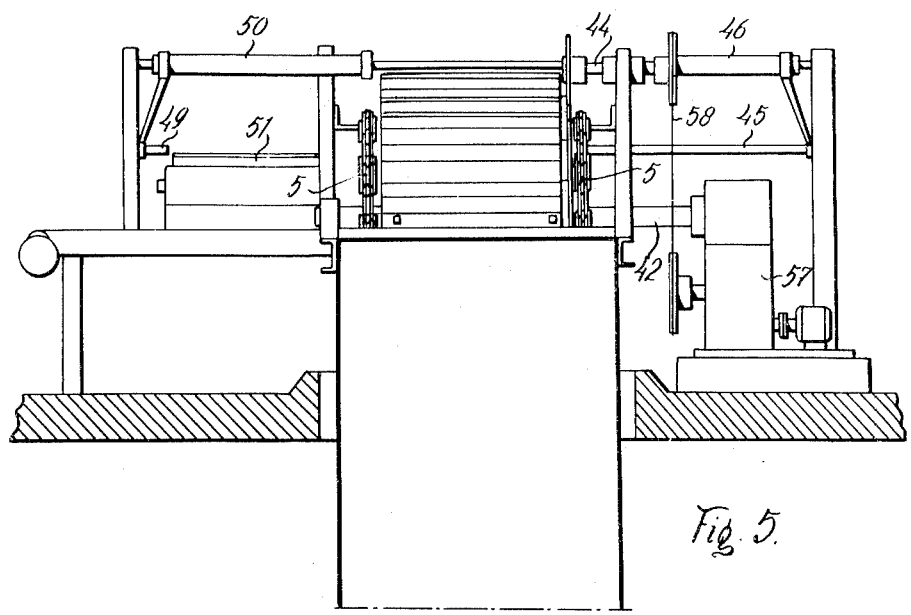
Figure 5 is a side elevation thereof.
Figure 6:
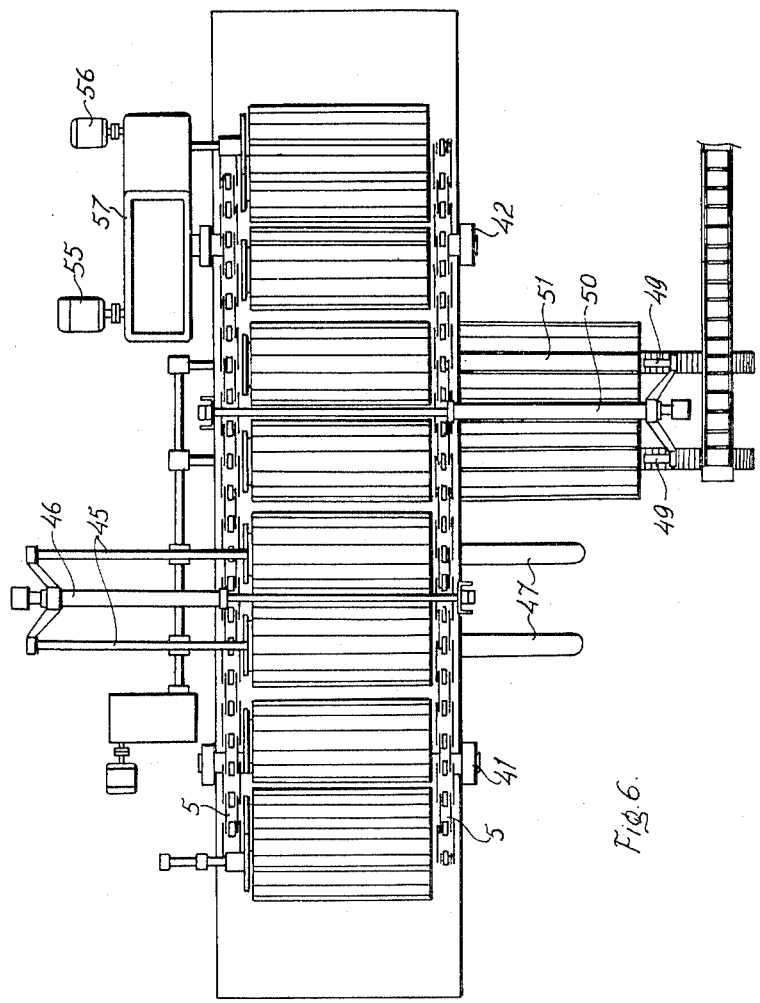
Figure 6 is a plan view thereof.

The terminal flange 26 of the support carries the sprocket 32, which is to engage with the driving chain 15 according to Figure 1. The return pulleys 17 and 18 for the driving chain 15 rest on shafts 43, 44, which are mounted higher up in the system. The unloading station 13 is located at the back in Figure 4. It consists of two parallel rods 45 (see also Figures 5 and 6), which are connected with a hydraulic or pneumatic cylinder 46, so that they can be moved longitudinally. They are so arranged that each of them can always enter into the lowest tube 12 of two supports 10 located just above the unloading station 13. They then push out the whole row of containers in the respective tube 12 towards the front in Figure 4, where these tins are taken on conveyors (for example gutters 47, Figure 6). A kind of pin wheel mechanism 48 turns the supports 10 to be unloaded one step further, when the rods 45 have been pulled back, upon which these rods 45 can enter the following tubes 12 and empty these again.

At the loading station 14 there is a similar device for loading the supports. Here again two supports 10, and of these the lowest tubes 12, are loaded at a time. This is done by means of push rods 49, lying at the front of the apparatus in Figure 4. These push rods 49 are operated by a hydraulic or pneumatic cylinder 50. The rows of tins are supplied on conveyors 51, on which they lie in a gutter, which is placed exactly opposite one of the rods 49, and is thus pushed into the support.

The chain 15 must have a motion relatively to the conveyor chains 5. In principle it is immaterial whether the chains 15 move in the opposite direction to the conveyor chains 5 or in the same direction, provided there is a difference of speed. The driving of the conveyor chains is effected by the driving of the shaft 42 of the pulleys 9, while the driving of the chain 15 is effected by the driving of the shaft 44 of the pulleys 18. These shafts 42 and 44 are coupled in such a way that the desired difference of speed is always maintained. The conveyor chains 5 are moved stepwise, in such a manner that each time two filled supports reach the unloading station 13, two empty supports consequently reach the loading station 14. Then the conveyor stops until the two supports at the unloading station 13 have been emptied and the two supports at the loading station 14 have been filled. Subsequently the conveyor moves on another step. Both during the motion and during the arresting of the conveyor the difference of speed between the chain 15 and the conveyor chains 5 must be kept at a constant value.

Figure 7:
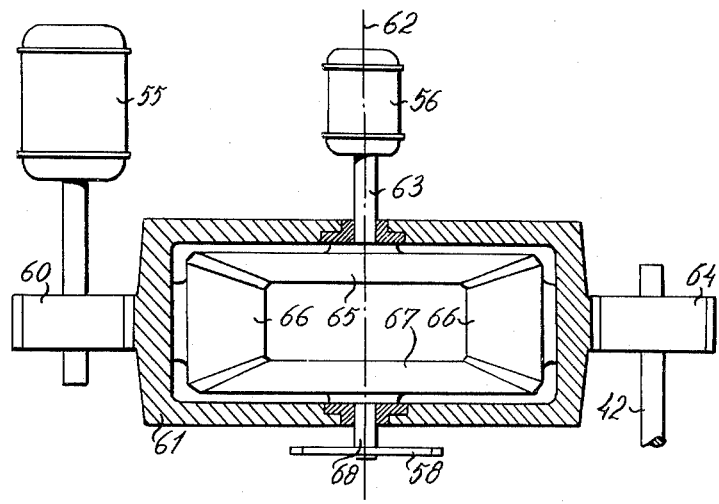
Figure 7 is a diagrammatic representation of the main driving gear.

The conveyor chains 5 are driven by a motor 55 (Figure 6), while a motor 56 is provided for driving the chains 15. Both motors are connected with a gear-case 57, from which also the shaft 42 is driven (see Figure 5) as well as the shaft 44, through a rope or chain drive 58. For illustration of the gear-case 57 reference may be made to Figure 7.

The motor 55 drives, via the pinion 60, the planet carrier 61, which is rotatable about the centre line 62. This line is also the centre line of the shaft 63, which is driven by the motor 56 (if necessary, via a transmission). On the other side of the planet carrier 61 drives the pinion 64, which is on the shaft 42 of the conveyor chains 5. The shaft 63 drives the sun wheel 65, which is in mesh with the planet wheels 66 of the planet carrier 61. On the other side these planet wheels 66 are in mesh with the sun wheel 67, which drives the shaft 68 of the rope or chain drive 58 for the shaft 44 of the chains 15.

When the motor 55 is stopped, the planet carrier 61 and the shaft 42 of the conveyor chains 5 are arrested. The motor 56 then drives the chains 15 via the sun wheel 65, the planet wheels 66, the sun wheel 67, and the transmission 58, at its own speed. When, however, the motor 55 is put into operation, so that the conveyor begins to travel through the system, the speed of the conveyor is added to that of the planet wheels 66 (i. e. if the right transmission is chosen), i. e. the speed of the conveyor is added to the speed of the chains 15. The motor 56 therefore always causes a certain relative speed of the chains 15 opposite the conveyor.

What I claim is:

1. Apparatus for continuously sterilizing foodstuffs packed in containers; said apparatus comprising a housing defining a tortuous passage including a pressurized steam chamber intermediate, and in communication with, U-shaped liquid seal chambers, an endless conveyor extending from the exterior of said housing through said steam chamber and into and out of said liquid seal chambers, a series of container carriers, means supporting said carriers at spaced apart locations on said conveyor for rotation about horizontal axes, each of said carriers including several channels extending parallel to the axis of rotation of the related carrier and arranged circularly around said axis for axially receiving and discharging containers packed with foodstuffs so that each carrier, when filled with containers, is rotationally balanced about its axis of rotation, container unloading and loading means arranged successively adjacent the path of travel of said conveyor at locations disposed outside of said housing, means operative to effect intermittent movement of said conveyor and to bring said conveyor to a halt between successive movements with at least one of said carriers disposed adjacent each of said unloading and loading means, and means operative to continuously rotate said carriers during the presence of the latter in said passage of the housing including an annular gear rack on each of said carriers concentric with the related axis of rotation, an endless driving chain extending parallel to the path of travel of said conveyor at the portions of said path disposed within said housing and there engaging said annular gear racks on the carriers, said driving chain being spaced relatively far apart from said path of the conveyor at the portion of said path extending past said unloading and loading means so that the said driving chain is disengaged from the annular gear racks of the carriers disposed adjacent said unloading and loading means, and means operative to continuously displace said driving chain relative to said conveyor during both the intermittent movements and the periods of rest of the latter.

2. Apparatus according to claim 1, wherein said means effecting intermittent movement of said conveyor includes an intermittently operated motor and first sprocket means in driving engagement with said conveyor, and said means operative to displace said drive chain includes a continuously operated motor and second sprocket means in driving engagement with said drive chain; and including differential gear means operatively interposed between said intermittently and continuously operated motors and said first and second sprocket means so that said first sprocket means is intermittently rotated by said intermittently operated motor and said second sprocket means is rotated at a varying speed which results from the combined rotational drive of said intermittently and continuously operated motors.

References Cited in the file of this patent

UNITED STATES PATENTS

| | | |
|---|---|---|
| 1,098,551 | Beckman | June 2, 1914 |
| 1,419,139 | Hunter | June 13, 1922 |
| 1,707,817 | Sanguinetts | Apr. 7, 1929 |
| 2,227,801 | Trofimov | Jan. 7, 1941 |
| 2,346,877 | Trofimov | Apr. 18, 1944 |
| 2,632,378 | Carvallo | Mar. 24, 1953 |